United States Patent Office 3,313,857
Patented Apr. 11, 1967

3,313,857
PROCESS FOR PREPARATION OF CHLORO-BROMOCARBONS
Samuel Gelfand, Niagara Falls, N.Y., assignor to Hooker Chemical Corporation, Niagara Falls, N.Y., a corporation of New York
No Drawing. Filed Nov. 21, 1963, Ser. No. 325,488
7 Claims. (Cl. 260—648)

This invention relates to a process for the preparation of chlorobromocarbons. More particularly it is concerned with a process for preparing polycyclochlorobromocarbons by reacting hexachlorocyclopentadiene and bromine.

The products prepared by the process of this invention are useful as chemical intermediates for organic syntheses and for the preparation of toxic substances, such as insecticides, fungicides, and the like. Their high melting points and high chlorine contents, in combination with bromine present, makes them useful as additives for imparting fire resistance and fire retarding properties to organic polymers, plastics and elastomers, particularly when combined with antimony compounds such as salts and oxides, as will be more fully described herein.

In accordance with the process of the present invention, hexachlorocyclopentadiene and bromine are contacted, mixed and reacted together in the presence of a catalytic amount of aluminum halide until the desired product results. The reactions occurring are illustrated by the following equation, which is not intended to be limiting;

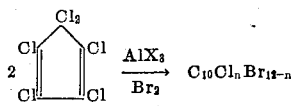

wherein

X is a halogen atom, such as chlorine or bromine; and $n$ is a number from 8 to 11 inclusive.

Generally, the reaction is effected by admixing together the aluminum halide and bromine followed by the addition and reaction of hexachlorocyclopentadiene. The temperature utilized to accomplish the reaction is the range of about 0 degrees centigrade to about 235 degrees centigrade, and preferably, is from about 40 degrees centigrade to about 150 degrees centigrade.

The amount of bromine to be employed will depend upon the number of bromine atoms desired in the final product. Generally, the ratio of moles of bromine to the hexachlorocyclopentadiene is in the range of from about 0.25 to 4 moles of bromine per mole of hexachlorocyclopentadiene. As the reaction is generally carried out about one half of the bromine charged appears in the final product. Thus, if it is desired to introduce one bromine atom into the final product, approximately one half mole of bromine is usually reacted in the initial reaction, while if it is desired to have four bromine atoms in the molecule, approximately 2 moles of bromine are reacted per mole of hexachlorocyclopentadiene. When less than one-half mole of bromine per mole of hexachlorocyclopentadiene is employed, a product is obtained in which only a portion of the product has bromine substitutents. The aluminum halide catalyst to be utilized in accomplishing the reaction can be aluminum chloride, aluminum bromide and the like. Aluminum chloride is preferred because of its low cost and availability. The proportion of aluminum halide employed is generally in the range from about 0.1 percent by weight to 20 percent by weight of the hexachlorocyclopentadiene used. Preferably, the amount of aluminum chloride is in the range of about 2 to 10 percent by weight of the hexachlorocyclopentadiene employed.

Although a solvent is not necessary, one can be utilized to facilitate the reaction. Such solvents as the halogenated organic solvents, preferably chlorinated, include hexachlorobutadiene, octachlorocyclopentene and perchloroethylene, and the like can be utilized. The preferred solvent because of its availability and boiling point is perchloroethylene.

The amount of time required to effect the reaction will depend upon the reactants and temperatures being utilized. Generally, however, the reaction is effected in from 2 to about 15 hours and preferably in from 3 to about 8 hours.

The catalyst is generally removed from the reaction system by partial or complete hydrolysis with water or aqueous hydrochloric acid followed by removal of solid inorganic salts from the organic solution by filtration or by separation of the aqueous liquid layer from the organic liquid layer. Other methods known in the art such as those employing other agents that react with or complex with the aluminum halide can be employed.

The amount of water to be used will depend on the amount of catalyst employed and the method of catalyst removal selected.

The desired product is obtained from the reaction mixture by methods known in the art, as for example by crystallization from the solvent and filtration.

That amount of water which will partly or completely hydrolyze the catalyst, resulting in a mixture which can be filtered, is employed. Also if desired a sufficient amount of water can be added which will dissolve the catalyst. Generally about 3 moles of water to 1 mole of catalyst is employed. However an excess of water, i.e., 10 moles of water or more to 1 mole of catalyst can be used. It is of course appreciated that in certain circumstances higher and lower amounts of water can be used, i.e., greater than 20 moles of water to 1 mole of catalyst providing it does not adversely affect the reaction mechanism.

Although it is not intended to be limited by theory it is believed that all of the bromine reactant employed does not end up in the product. The free bromine that does not appear in the product is added to double bonds in the solvent along with any replaced chlorine. It is thus believed that the reaction combines the replacement of at least one chlorine of hexachlorocyclopentadiene by bromine and dimerization.

Illustrative examples of the compounds which may be produced by the process of the present invention include $C_{10}Cl_{11}Br$, $C_{10}Cl_{10}Br_2$, $C_{10}Cl_9Br_3$, $C_{10}Cl_8Br_4$ and the like, as evidenced by analyses and molecular weight determinations, as described herein.

In a preferred embodiment of the present invention the compounds as represented by the following structures are included herein although it is not intended to be limiting thereto.

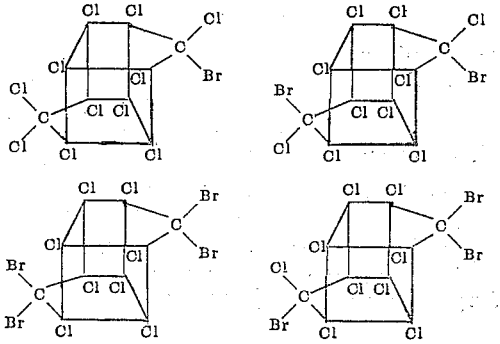

The following examples illustrate the practice of the invention but are not intended to be construed as limiting the same. In the specification, examples and claims, parts are by weight and temperatures are in degrees centigrade, unless otherwise indicated.

EXAMPLE 1

A mixture of perchloroethylene (280 grams), bromine (80 grams or 0.5 mole) and aluminum chloride (14 grams) was stirred at room temperature for one hour. Hexachlorocyclopentadiene (273 grams or 1 mole) was then added and the reaction temperature was gradually increased to 116 degrees centigrade and was maintained at that temperature for six hours. An additional 5 grams of aluminum chloride was then added and the reaction mixture was stirred at 115 degrees centigrade for an additional 4 hours. The reaction mixture was diluted with 450 grams of perchloroethylene and 15 milliliters of water were added. After the evolution of hydrogen chloride ceased, the mixture was filtered hot to remove hydrolyzed aluminum chloride catalyst. The product was crystallized by cooling the filtrate to 15 degrees centigrade and isolated by filtration. The product was washed with acetone and was dried, to yield 209 grams of $C_{10}Cl_{11}Br$.

*Analysis*

Molecular weight:
    Theoretical for $C_{10}Cl_{11}Br$ _____ 590
    Found by vapor pressure osmometry _____ 588

Bromine content:                    Percent bromine
    Theoretical for $C_{10}Cl_{11}Br$ _____ 13.5
    Found by X-ray analysis _____ 14.1

EXAMPLE 2

The procedure of Example 1 is repeated utilizing substantially equivalent amount of hexachlorobutadiene in the place of perchloroethylene, and aluminum bromide in the place of aluminum chloride, to obtain $C_{10}Cl_{11}Br$.

EXAMPLE 3

Perchloroethylene (280 grams), aluminum chloride (14 grams), and bromine (160 grams or 1.0 mole) were mixed together and stirred at room temperature for one hour after which hexachlorocyclopentadiene (273 grams or 1 mole) was added and the temperature was gradually increased to 112 degrees centigrade over a two hour period. The temperature was maintained at 112–120 degrees centigrade for 4½ hours. The reaction mixture was then diluted with 480 grams of perchloroethylene and 15 grams of water were added to decompose the catalyst by hydrolysis. The diluted reaction mixture was then heated to reflux at a temperature of 124 degrees centigrade and filtered hot to remove the catalyst hydrolysis products. The filtrate was cooled to 5 degrees centigrade, at which temperature the product crystallized. It was filtered, dried free of perchloroethylene, washed with 150 milliliters of acetone, and dried again, resulting in a yield of 225 grams of $C_{10}Cl_{10}Br_2$.

*Analysis*

Molecular weight:
    Theoretical for $C_{10}Cl_{10}Br_2$ _____ 634.5
    Found by vapor pressure osmometry _____ 630

Bromine content:                    Percent bromine
    Theoretical for $C_{10}Cl_{10}Br_2$ _____ 24.0
    Found by X-ray analysis _____ 25.6

A portion of the product was recrystallized from perchloroethylene and was analyzed for bromine by means of X-ray technique. Found 25.2% bromine.

EXAMPLE 4

The procedure of Example 3 is repeated utilizing 320 grams (2 moles) of bromine in place of the 160 grams (1 mole) of bromine to obtain a product containing $C_{10}Cl_8Br_4$.

EXAMPLE 5

A mixture of perchloroethylene (140 grams) hexachlorocyclopentadiene (137.5 grams or 0.5 mole), aluminum chloride (7 grams) and bromine (10 grams or 0.125 mole) was stirred and the temperature thereof was gradually increased to 116–118 degrees centigrade, at which temperature the reaction mixture was maintained for seven hours. The reaction mixture was diluted with 120 milliliters of perchloroethylene and the catalyst was hydrolyzed with 4 milliliters of water. The reaction mixture was then filtered hot to remove catalyst decomposition products and the filtrate was cooled to crystallize out the product. After filtration and drying, the yield of product was 103 grams. A second portion of product was also obtained from the supernatant liquid.

*Analysis calculated*

Found by X-ray: 3.75% bromine.

After recrystallization from perchloroethylene, the analysis was 3.8 percent bromine as determined by X-ray. Based on the total yield of product isolated, about one-half of the bromine used appeared in the product.

EXAMPLE 6

60.5 parts of asphalt were heated to 200 degrees until melted. The molten asphalt was then removed from the source of heat and 32.5 parts of mineral spirits were added with stirring. Stirring was continued and 7.05 parts of finely divided asbestos fiber (Quebec Asbestos Standard Grade 7R) were added. The mixture was then cooled to room temperature and was used as base material for the flame retardant compositions of the following examples.

EXAMPLE 7

To 100 parts of the base material of Example 6, were added 18.2 parts (30.0 percent, based on asphalt content) of $C_{10}Cl_{10}Br_2$ of Example 3 and 3 parts (5 percent based on asphalt content) of antimony oxide. The mixture was stirred at room temperature until uniform.

A coating was prepared on three inch by twelve inch saturated asphalt felt by applying the above composition with a knife at a coverage rate of two gallons for each 100 square feet, to make a coating about 1/16 of an inch thick. The strips were allowed to dry until substantially all of the mineral spirits were removed by evaporation.

Testing was performed to determine the relative flammability of the coating by supporting the strip in a draft free hood at an angle of 30 degrees from the vertical and applying a flame from a compressed propane portable blow torch. The flame was adjusted to give a 1½ inch inner blue cone and was applied perpendicular to the face of the strip for a period of 14 seconds after which it was removed. The time needed for the flame to become extinguished was recorded. A second 15-second flame application was made immediately after the first flame had become self-extinguished and the self-extinguishing time was again recorded. If the specimen was self-extinguishing or did not burn upon the second ignition, it was judged to be self extinguishing by this test. Intumescence was measured at the highest point of rise. Duplicate samples were tested and the values were averaged.

The composition of this invention was self extinguishing in 2.6 seconds after the first ignition and 2.9 seconds after the second ignition. An intumescence of 0.22 inch was observed. The composition was considered to be non-burning.

Additional compositions were prepared and tested, as in the preceding example. Results are summarized below.

| Example | Fire Retardant | Parts of Retardant | Parts Sb₂O₃ | Self-Extg. Time (Sec.) 1st Appl. | Self-Extg. Time (Sec.) 2nd Appl. | Intumescence (in.) | Flammability |
|---|---|---|---|---|---|---|---|
| 8 | C₁₀Cl₁₁Br (Ex. 1) | 18.2 | 3:0 | 1.9 | 3.6 | 0.44 | Non-burning. |
| 9 | None (control) | None | None | 3.0 | Burns | None | Burns. |

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the preparation of a cyclochlorobromocarbon comprising reacting hexachlorocyclopentadiene with bromine at a temperature of from about 0 to about 235 degrees centigrade in the presence of an aluminum halide selected from the group consisting of aluminum chloride and aluminum bromide.

2. A process for the preparation of a cyclochlorobromocarbon of the formula $C_{10}Cl_nBr_{12-n}$, wherein $n$ is from 8 to 11 inclusive, which comprises reacting hexachlorocyclopentadiene with bromine at a temperature of from about 0 to about 235 degrees centigrade in the presence of a catalytic proportion of an aluminum halide selected from the group consisting of aluminum chloride and aluminum bromide.

3. A process in accordance with claim 2 wherein the reaction is accomplished in the presence of a halogenated organic solvent selected from the group consisting of hexachlorobutadiene, octachlorocyclopentene and perchloroethylene.

4. A process in accordance with claim 3 wherein the aluminum halide is aluminum chloride.

5. A process in accordance with claim 3 wherein from 0.25 to about 4 moles of bromine per mole of hexachlorocyclopentadiene are utilized.

6. A process in accordance with claim 3 wherein the reaction is accomplished in the presence of a perchlorinated lower alkene solvent.

7. A process in accordance with claim 3 wherein the solvent is perchloroethylene.

References Cited by the Examiner

UNITED STATES PATENTS 2,553,518　5/1951　Lake et al. _____ 260—648
2,729,687　1/1956　Sterling _____ 260—658 X
2,996,553　8/1961　Johnson _____ 260—648

LEON ZITVER, *Primary Examiner.*

M. JACOB, *Assistant Examiner.*